US007980624B2

(12) United States Patent
Hillen et al.

(10) Patent No.: US 7,980,624 B2
(45) Date of Patent: Jul. 19, 2011

(54) DEVICE FOR ACTUATING THE PIVOTING MOVEMENT OF A VEHICLE FLAP

(75) Inventors: Jörg Hillen, Nörtershausen (DE); Michael Kleinmann, Melsbach (DE); Andreas Ritter, Hilgert (DE)

(73) Assignee: Stabilus GmbH, Koblenz (DE)

( * ) Notice: Subject to any disclaimer, the term of this patent is extended or adjusted under 35 U.S.C. 154(b) by 0 days.

(21) Appl. No.: 12/702,856

(22) Filed: Feb. 9, 2010

(65) Prior Publication Data

US 2010/0181800 A1 Jul. 22, 2010

Related U.S. Application Data

(62) Division of application No. 11/481,235, filed on Jul. 5, 2006, now abandoned.

(30) Foreign Application Priority Data

Jul. 8, 2005 (DE) ........................ 10 2005 031 990

(51) Int. Cl.
*B62D 37/02* (2006.01)

(52) U.S. Cl. ................................ 296/180.5; 296/181.5

(58) Field of Classification Search ............... 296/180.3, 296/180.5, 181.5, 146.4; 49/325; 74/89.2, 74/502.6

See application file for complete search history.

(56) References Cited

U.S. PATENT DOCUMENTS

| | | | | |
|---|---|---|---|---|
| 4,773,692 A | | 9/1988 | Schleicher et al. | 296/180.5 |
| 4,904,015 A | | 2/1990 | Haines | 296/180.3 |
| 5,165,751 A | * | 11/1992 | Matsumoto et al. | 296/180.5 |
| 5,986,420 A | | 11/1999 | Kato | 318/272 |
| 6,145,917 A | | 11/2000 | Ishii et al. | 296/146.1 |
| 6,382,708 B1 | | 5/2002 | Erdelitsch et al. | 296/180.5 |
| 6,557,924 B2 | * | 5/2003 | Lauderbach et al. | 296/146.4 |
| 6,814,395 B1 | | 11/2004 | Lin | 296/180.1 |
| 7,387,330 B2 | | 6/2008 | Froeschle et al. | 296/180.5 |
| 7,506,556 B2 | * | 3/2009 | Ritter et al. | 74/89.2 |
| 7,648,189 B2 | * | 1/2010 | Porat et al. | 296/146.4 |
| 7,866,729 B2 | * | 1/2011 | Porat et al. | 296/146.4 |
| 2001/0035725 A1 | | 11/2001 | Mintgen et al. | |
| 2002/0021022 A1 | | 2/2002 | Erdelitsch et al. | 296/180.1 |
| 2002/0067049 A1 | | 6/2002 | Pettey | 296/180.5 |
| 2002/0074826 A1 | | 6/2002 | Presley | 296/180.1 |
| 2004/0159170 A1 | | 8/2004 | Ritter | 74/89.22 |
| 2004/0256885 A1 | | 12/2004 | Bui | 296/180.5 |
| 2007/0007796 A1 | | 1/2007 | Arenz et al. | 296/180.5 |
| 2007/0236044 A1 | | 10/2007 | Froeschle et al. | 296/180.5 |

* cited by examiner

*Primary Examiner* — Jason S Morrow
(74) *Attorney, Agent, or Firm* — Cohen Pontani Lieberman & Pavane LLP

(57) ABSTRACT

The device for actuating a pivoting movement of a vehicle flap about a pivot axis includes a gas spring having a cylinder and a piston rod protruding from the cylinder. Either the cylinder or the piston rod is coupled to a fixed component of the vehicle body, and the other one of cylinder and piston rod is coupled to the flap at a distance from the pivot axis. A flexurally rigid guide extends parallel adjacent to the gas spring and is fixedly connected to the cylinder of the gas spring. One region of a flexible tension and compression element is guided in the guide and operatively connected to the flap, and a second region is guided in a flexible casing and operatively connected to a reversible drive, so that the flexible tension and compression element can be motor-driven.

15 Claims, 3 Drawing Sheets

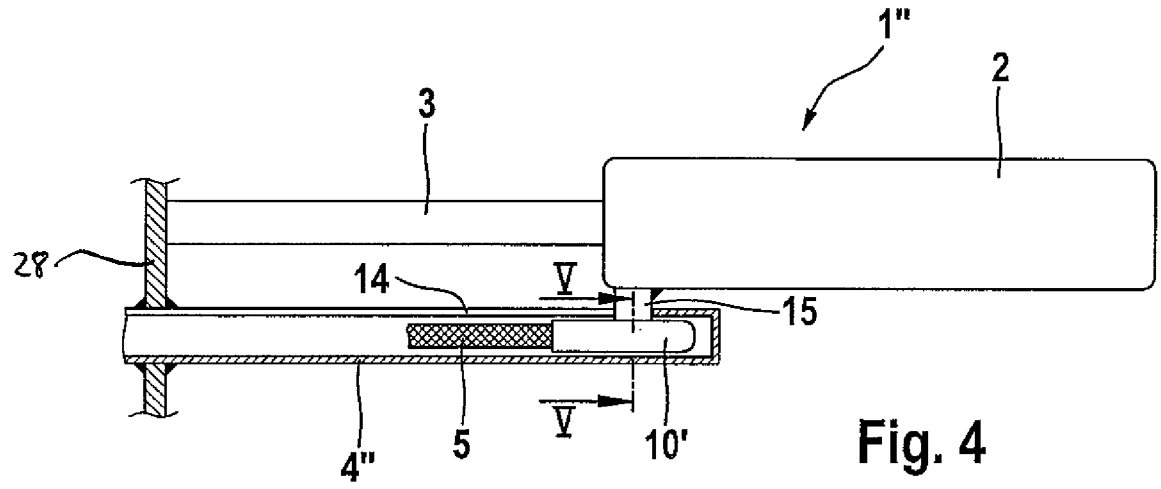
Fig. 4
Fig. 5
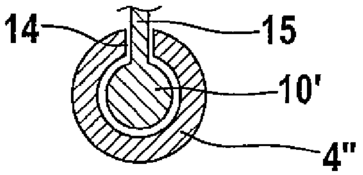
Fig. 6
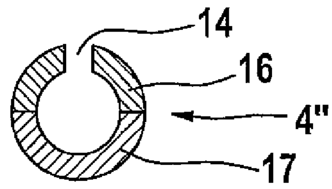

DEVICE FOR ACTUATING THE PIVOTING MOVEMENT OF A VEHICLE FLAP

This application is a Divisional of U.S. patent application Ser. No. 11/481,235, filed Jul. 5, 2006, now abandoned which claims priority from Applications filed in Germany on Jul. 8, 2005, No. 10 2005 031 990.4, respectively. The disclosure of U.S. patent application Ser. No. 11/481,235 is incorporated herein by reference.

BACKGROUND OF THE INVENTION

In a device of this type, it is known to guide the pushing and pulling element in a coaxial bore in the piston rod, the rod-like end region of the pushing and pulling element protruding through the interior of the cylinder. This design requires seals both on the pushing and pulling element, which is guided from the outside into the interior of the cylinder, and on the piston rod, which is guided to the outside, the seal of the pushing and pulling element being arranged on an axially movable component and therefore provides an increased leakage problem.

SUMMARY OF THE INVENTION

It is an object of the invention to provide a device for actuating the pivoting movement of a vehicle flap which is constructed in a simple manner and requires as few and as secure seals as possible on the movable components guided to the outside from the interior of the cylinder, and permits the gas spring and motor drive to be arranged spatially independently of each other.

In a preferred embodiment of the invention, the device comprises a gas spring having a cylinder extending in a longitudinal direction and a piston rod extending out of one side of the cylinder, one of the cylinder or the piston rod being coupled to a fixed component of a body of the vehicle, and the other one of the cylinder and the piston rod being coupled to the flap at a distance from the pivot axis, a flexurally rigid guide extending in the longitudinal direction parallel adjacent to the gas spring and being fixedly connected to the cylinder of the gas spring, a flexible tension and compression element having first and second regions, the first region being guided in the guide and being operatively connected to the flap and the second region being guided in a flexible casing; and a reversible drive connected to the second region such that the flexible tension and compression element is drivable by the reversible drive in the longitudinal direction.

In this design, the piston rod, which is led out of the cylinder, is the only movable component to be sealed, so that leakage problems are reduced.

The motor drive does not have to be arranged in the region of the flap but rather may be placed at a location remote therefrom.

During an extension movement of the piston rod, the forces of the motor drive and the gas spring drive are added together while, during a retraction of the piston rod, the force of the motor drive is subtracted from the force of the gas spring.

In order to avoid buckling of the flexible part of the tension and compression element over the extension length of the piston rod, the longitudinal extent of the guide can approximately correspond to the extension length of the piston rod of the gas spring.

For the simple application of force to the flap both by the gas spring and by the tension and compression element, it is possible, in a simple manner, to connect the end region of the pushing and pulling element to a pushing and pulling rod which is connected at its free end via a connecting member to the free end of the piston rod protruding out of the cylinder.

An increase of the push-out force that requires only a small amount of additional construction space is achieved by the gas spring and the guide being enclosed at a radial distance by a helical compression spring which is supported at its one end on the connecting member and at its other end on a supporting member fixedly connected to the cylinder.

According to a second preferred embodiment of the invention, the device comprises a gas spring having a cylinder extending in a longitudinal direction and a piston rod extending out of one side of the cylinder, one of the cylinder or the piston rod being coupled to a fixed component of a body of the vehicle, and the other one of the cylinder and the piston rod being coupled to the flap at a distance from the pivot axis, a flexurally rigid guide extending in the longitudinal direction parallel and adjacent to the gas spring and having one end portion fixedly connected to the one of the cylinder or the piston rod, a flexible tension and compression element having first and second regions, the first region being guided in the guide, being connected to the other one of the cylinder and the piston rod and being operatively connected to the flap, and the second region being guided in a flexible casing, and a reversible drive connected to the second region such that the flexible tension and compression element is drivable by the reversible drive in the longitudinal direction.

Also in this embodiment, the piston rod, which is led out of the cylinder, is the only movable component to be sealed, so that leakage problems are reduced.

The motor drive does not have to be arranged in the region of the flap but rather may be placed at a location remote therefrom.

During an extension movement of the piston rod, the forces of the motor drive and the gas spring drive are added together while, during a retraction of the piston rod, the force of the motor drive is subtracted from the force of the gas spring.

In order to permit a simple connection of the tension and compression element to the cylinder, a slot is formed in the guide on its side facing the cylinder, the slot extending in the longitudinal direction, and a connecting element is provided radially protruding through the slot and fixedly connecting the end region of the tension and compression element to the cylinder.

The guide can comprise both a continuous guide tube or a plurality of guide tube sections arranged coaxially at a distance one behind another.

For the simple installation of the tension and compression element, it is possible for the guide tube or the guide tube sections to be composed of half tube parts connected to each other, the assembly of which takes place after the tension and compression element has been fitted.

In a third embodiment, the device comprises a gas spring having a cylinder extending in a longitudinal direction, a piston, and a piston rod having a cross-sectional dimension and extending out of a first side of the cylinder, one of the cylinder and the piston rod being coupled to a fixed component of a body of the vehicle, and the other one of the cylinder and the piston rod being coupled to the flap at a distance from the pivot axis, a flexurally rigid guide extending in the longitudinal direction from a second side of the cylinder of the gas spring opposite from said first side, a flexible tension and compression element having a first region guided in the guide and a second region guided in a flexible casing, a connecting rod having a cross-sectional dimension and extending in a sealed manner into the cylinder through the second side and being fixedly connected to the piston, wherein the cross-sectional dimension of the piston rod exceeds the cross-sectional dimension of the connecting rod, the first region being operatively connected to the flap through the connecting rod and the piston rod, and a reversible drive connected to the second region such that the flexible tension and compression element is drivable by the reversible drive in the longitudinal direction.

This embodiment makes it possible that the seals for the tension and compression element in the piston rod are arranged in each case on fixed components which are not axially movable, so that the seal is highly reliable.

Furthermore, the motor drive does not have to be arranged in the region of the flap but rather may be placed at a location remote therefrom.

During an extension movement of the piston rod, the forces of the motor drive and the gas spring drive are added together while, during a retraction of the piston rod, the force of the motor drive is subtracted from the force of the gas spring.

In a fourth embodiment, the device comprises a gas spring having a cylinder extending in a longitudinal direction and a piston rod extending through one side of the cylinder, the cylinder being operatively coupled to the flap at a distance from the pivot axis, and the piston rod being coupled to a fixed component of a body of the vehicle, a first flexurally rigid guide connected at a distance from the pivot axis of the flap to a fixed component of the body of the vehicle, a second guide connected to a fixed component of the body of the vehicle and extending in the longitudinal direction parallel and adjacent to the gas spring, a flexible tension and compression element having a first region, a second region, and a third region intermediate the first and second regions, the first region being guided in the first guide and connected to the flap, the second region being guided in the second guide and being connected to the cylinder, and the third region being guided in a flexible casing and connecting the first and second regions, and a reversible drive operatively connected for acting on the second region such that the flexible tension and compression element is drivable by the reversible drive in the longitudinal direction.

Also in this embodiment, the piston rod, which is led out of the cylinder, is the only moveable component to be sealed, so that leakage problems are reduced.

The motor drive does not have to be arranged in the region of the flap but rather may be placed at a location remote therefrom.

During an extension movement of the piston rod, the forces of the motor drive and the gas spring drive are added together while, during a retraction of the piston rod, the force of the motor drive is subtracted from the force of the gas spring.

In order to permit a simple connection of the tension and compression element to the cylinder, a slot can be formed in the second guide on its side facing the cylinder, the slot extending in the longitudinal direction, and a connecting element can be provided radially protruding through the slot and fixedly connecting the end region of the tension and compression element to the cylinder.

The second guide may comprise both a continuous guide tube or a plurality of guide tube sections arranged coaxially at a distance one behind another.

For the simple installation of the tension and compression element, it is possible that the guide tube or the guide tube sections are composed of half tube parts connected to each other, the assembly of which takes place after the tension and compression element is fitted.

The cylinder of the gas spring can be moved in the longitudinal direction by a spindle drive. A simple design consists in that a threaded spindle extending parallel to the longitudinal direction is fastened at its one end to the cylinder of the gas spring, while an axially fixed spindle nut which can be driven rotatably by a motor drive is arranged on the threaded spindle.

In a simple design, the tension and compression element is a cable.

The motor drive can be a reversible electric motor. If the electric motor is a non-self-locking electric motor, this permits a manual operation of the flap when current is not being supplied to the electric motor.

The flap can be locked in its closed position preferably by a lock which can be opened, for example an electromechanical lock.

A plurality of tension and compression elements can be driven by a motor drive each of them leading to a gas spring.

In order to be able to operate, in particular, large flaps with a symmetrical application of torque, one flap can be pivoted by a plurality of devices.

To protect the tension and compression element against damage, it can be driven by the drive via a coupling, in particular an electromechanical coupling.

This coupling, which can be designed as an overload coupling, can be arranged in the motor drive or as a ratchet mechanism in the region of the tension and compression element.

If the speed of movement of the flap is detected by a sensor and its measured value is compared with a desired value, the drive can be driven in a stoppable or reversible manner if the measured value is lower than the desired value. Thus, an obstacle in the pivoting region of the flap can be recognised and the drive can be stopped or reversed.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Exemplary embodiments of the invention are illustrated in the drawings and are described in more detail below.

FIG. 4 is a partially sectional lateral view of a fourth exemplary embodiment of a device according to the invention;

FIG. 5 is a cross-sectional view of a first exemplary embodiment of a guide of the device according to FIG. 4 along the line V-V in FIG. 4;

FIG. 6 is a cross-sectional view of a second exemplary embodiment of a guide of the device according to FIG. 4 along the line V-V in FIG. 4;

DETAILED DESCRIPTION OF THE PRESENTLY PREFERRED EMBODIMENTS

The devices illustrated in the Figures have a gas spring 1,1',1",1'" which comprises a longitudinally extending cylinder 2, 2' filled with compressed gas and a piston rod 3 led out of the cylinder 2, 2' on one side in a sealed manner. The piston rod 3 or a piston 13 connected to it is loaded in the extension direction by the compressed gas in the cylinder 2.

Figure 1:
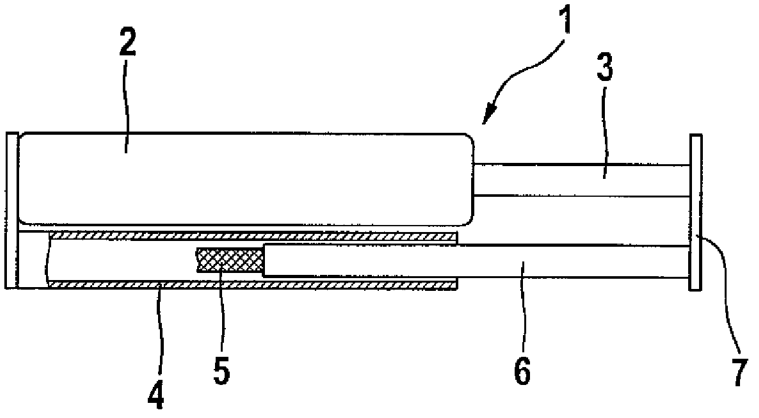
FIG. 1 is a partially sectional lateral view of a first exemplary embodiment of a device according to the invention.
Figure 2:
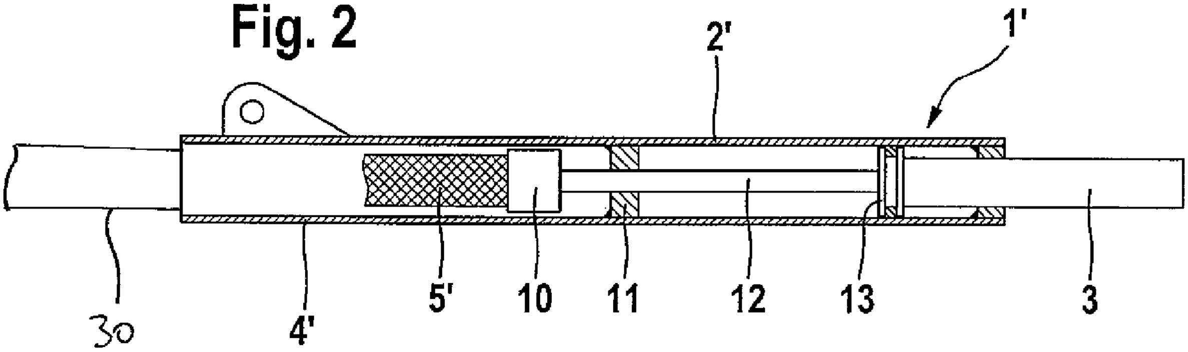
FIG. 2 is a sectional lateral view of a second exemplary embodiment of a device according to the invention.
Figure 3:
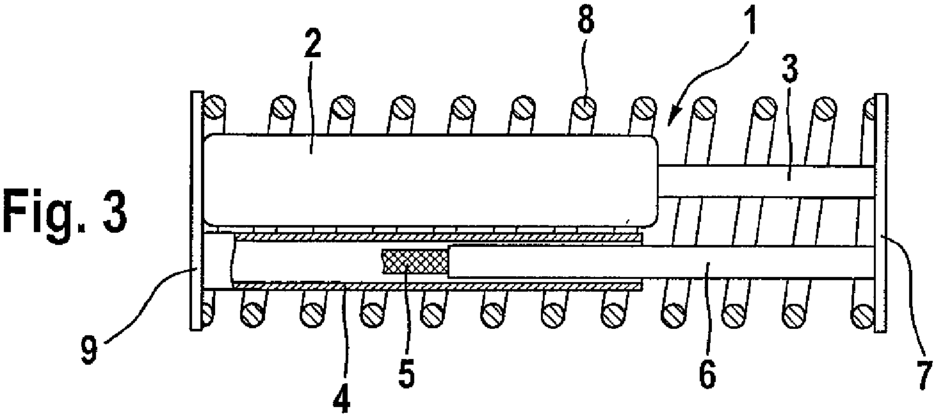
FIG. 3 is a partially sectional lateral view of a third exemplary embodiment of a device according to the invention.
Figure 7:
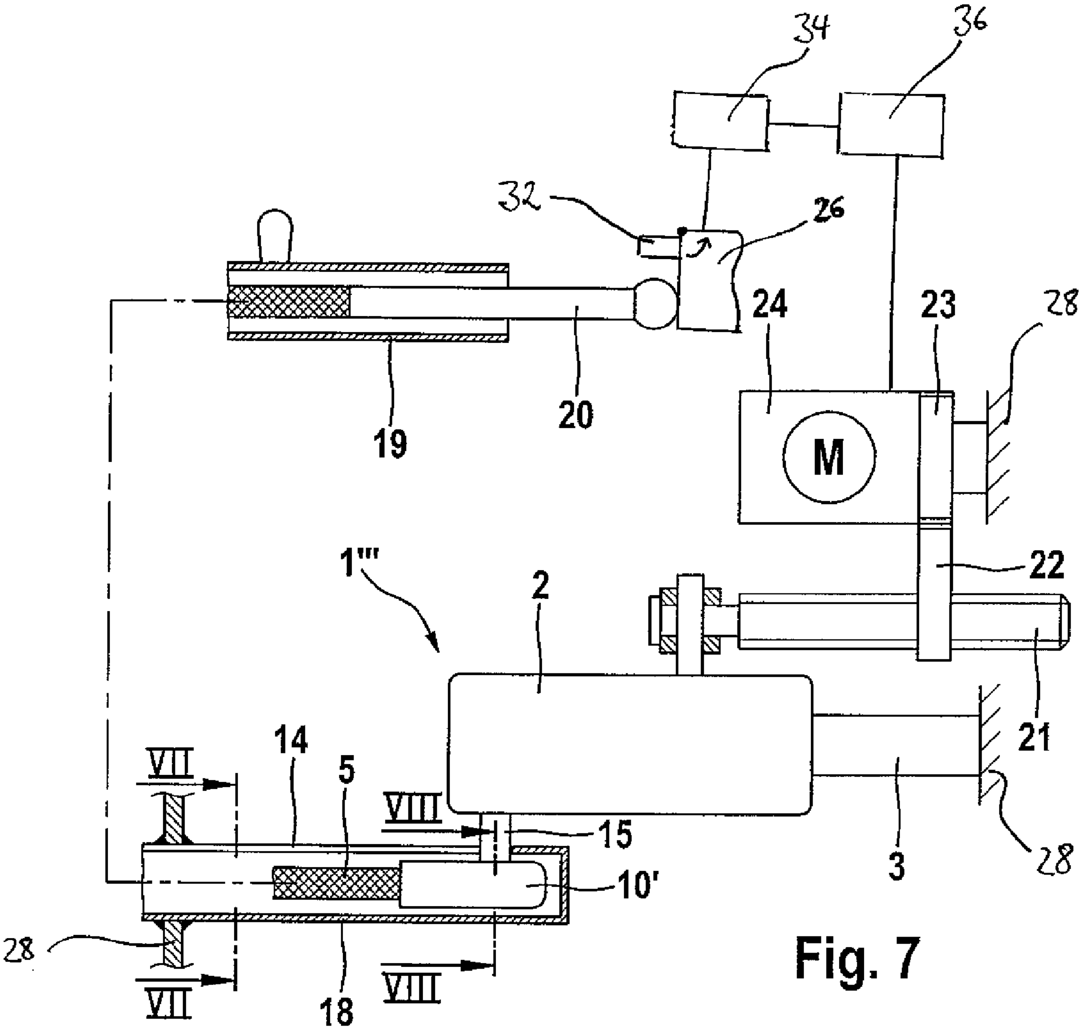
FIG. 7 is a partially sectional lateral view of a fifth exemplary embodiment of a device according to the invention.
Figure 8:
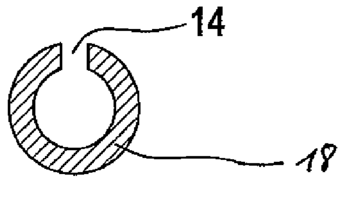
FIG. 8 is a cross-sectional view of the device according to FIG. 7 along the line VII-VII in FIG. 7.
Figure 9:
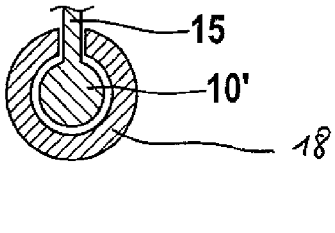
FIG. 9 is a cross-sectional view of the device according to FIG. 7 along the line VIII-VIII in FIG. 7.

The exemplary embodiments of FIGS. 1 to 3 have in common that the free end of the piston rod 3 protruding out of the cylinder 2, 2' is coupled to a flap 26 (as shown in FIG. 7), which can be pivoted about a pivot axis, at a distance from this pivot axis.

The cylinder 2 here is coupled to a fixed component 28 (as shown in FIGS. 4 and 7) of the body of the motor vehicle.

In FIGS. 1 and 3, there is arranged parallel adjacent to the cylinder 2 of the gas spring 1 a guide tube 4 of approximately identical length, one end of which is fixedly connected to that end of the cylinder 2 which is opposite the piston rod 3.

A tension and compression element in form of a cable 5 is arranged in the cylindrical guide tube 4, the one end region of this cable 5 being connected to a flexurally rigid pushing and pulling rod 6 which is connected at its free end via a connecting member 7 to the free end of the piston rod 3 protruding out of the cylinder 2.

On the side opposite the pushing and pulling rod 6, the cable 5 is guided by a flexible casing 30 (see FIG. 2) adjoining the guide tube 4 to a reversible motor drive 24 (see FIG. 7) and can be driven movably in the longitudinal direction by the latter.

In the closed state of the flap 26, the piston rod 3 is retracted into the cylinder 2. The flap 26 can be held in this position by a lock 32 (see FIG. 7), for example an electromechanical lock.

If the lock 32 is opened, the piston rod 3 is moved in the extension direction by the gas pressure in the cylinder 2 and is also acted upon in this direction by the pushing and pulling rod 6, since the cable 5 is driven in a pushing manner by the motor drive 24.

As a result, the flap 26 pivots into its open position.

If the flap 26 is now to be closed again, a reversal of the movement of the motor drive 24 takes place, the drive 24 then driving the cable 5 in a pulling manner and thus using the pushing and pulling rod 6 and the connecting member 7 to pull the piston rod 3 into the cylinder 2 and to pivot the flap 26 into its closed position until it latches into the lock 32.

In the exemplary embodiment of FIG. 3, the opening movement is assisted by a helical compression spring 8 which surrounds the gas spring 1 and the guide tube 4 at a radial distance and is supported at its one end on the connecting member 7 and at its other end on a supporting member 9 fixedly connected to the cylinder 2.

To close the flap 26, the force of this helical compression spring 8 has additionally to be overcome.

In the exemplary embodiment of FIG. 2, the cylinder 2' extends beyond the region filled with compressed gas, this continuation of the cylinder 2' forming the guide tube 4 in which a pushing and pulling member 10 is guided displacably.

At its one end, the pushing and pulling member 10 is connected to a connecting rod 12 which extends coaxially in a sealed manner through a base 11 within the cylinder 2' and is connected at its other end to a piston 13 mounted on the piston rod 3, the piston 13 being arranged displacably in the cylinder 2'.

In this case, the piston rod 3 has a significantly larger cross-section than the connecting rod 12, so that the compressed gas in the cylinder 2' can move the piston 12 in the extension direction of the piston rod 3 and the piston rod 3 can act upon the flap 26 in the opening direction.

The one end of a cable 5' is fastened to that end of the pushing and pulling member 10 which is opposite the connecting rod 12, the cable, corresponding to FIGS. 1 and 3, leading in a flexible casing 30 to a reversible motor drive 24 which drives the cable 5' in a pushing manner to open the flap 26 and in a pulling manner to close the flap 26.

In the exemplary embodiment of FIG. 4, the free end of the piston rod 3 protruding out of the cylinder 2 is coupled to a fixed component 28 of a motor vehicle while the cylinder 2 is coupled to a flap 26, which can be pivoted about a pivot axis, at a distance from this pivot axis.

A guide tube 4" is arranged parallel to the gas spring 1", the guide tube 4" having, on its side facing the cylinder 2, a slot 14 extending in the longitudinal direction.

At its one end, the guide tube 4" is likewise fastened to the fixed component 28 of the motor vehicle. A pushing and pulling member 10' is guided displacably in the guide tube 4" and is connected at its one end to a cable 5 which, similar to FIGS. 1 to 3, leads in a flexible casing 30 to a reversible motor drive 24 which can drive the cable 5 in a pushing manner to open the flap 26 and in a pulling manner to close the flap 26. For this purpose, the pushing and pulling member 10' is fixedly connected to the cylinder 2 via a connecting element 15 protruding radially through the slot 14.

As illustrated in FIG. 5, the guide tube 4" can be designed as a single part.

To facilitate installation, the guide tube 4" can also be assembled, according to FIG. 6, from two half tube parts 16 and 17.

In the exemplary embodiment of FIG. 7, that end of the piston rod 3 which protrudes out of the cylinder 2 is fastened to a fixed component 28 of a motor vehicle while the cylinder 2 can be moved relative to the fixed component 28.

A second guide tube 18 is arranged parallel to the gas spring 1''', the guide tube 18 having, on its side facing the cylinder 2, a slot 14 extending in the longitudinal direction.

At its one end, the guide tube 18 is likewise fastened to the fixed component 28 of the motor vehicle.

A pushing and pulling member 10' is guided displacably in the guide tube 18 and is connected at its one end to a cable 5 which leads in a flexible casing 30 (see FIG. 2) to a first guide tube 19 and ends there at a second pushing and pulling member 20 to which it is connected. The end of the cable 5 and the adjoining part of the second pushing and pulling member 20 are guided displacably in the first guide tube 19 coupled to a fixed component 28 of the motor vehicle, with the free end of the pushing and pulling member 20 protruding out of the first guide tube 19 and being connected in an articulated manner to the flap 26 at a distance from the pivot axis of the flap 26.

A threaded spindle 21 extending in the longitudinal direction parallel to the gas spring 1''' is fastened at its one end to the cylinder 2 of the gas spring 1'''. An axially fixed spindle nut 22 sits on the threaded spindle 21 and can be driven rotatably by a driven pinion 23 of a reversible electric motor 24 fixedly connected to the fixed component 28 of the motor vehicle. The motor 24 can be, for example, a non-self-locking electric motor.

The cable 5 can be driven by the drive 24 via an electromechanical coupling.

Depending on the direction of rotation of the electric motor 24, the cylinder 2 is moved by the spindle drive, which is formed by spindle nut 22 and threaded spindle 21, retracting or extending the piston rod 3, and can thus move the flap 26 in the opening direction or in the closing direction via the first pushing and pulling member 10', the cable 5 and the second pushing and pulling member 20.

For this purpose, the pushing and pulling member 10' is fixedly connected to the cylinder 2 via a connecting element 15 protruding radially through the slot 14.

A sensor 34 for detecting a speed of movement of the flap 26 and a device 36 for comparing a measured value of the speed of movement with a desired value can be provided, so that the drive can be driven in a stoppable or reversible manner if the measured value is lower than the desired value.

It can be useful to provide a plurality of tension and compression elements which each lead to a gas spring and can be driven by the drive. A large flap can also be pivoted by a plurality of devices according to the invention.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A device for actuating a pivoting movement of a flap of a vehicle about a pivot axis, the device comprising:

a gas spring having a cylinder extending in a longitudinal direction and a piston rod extending out of one side of the cylinder, one of the cylinder or the piston rod configured to be coupled to a fixed component of a body of the vehicle, and the other one of the cylinder and the piston rod configured to be coupled to the flap at a distance from the pivot axis;

a flexurally rigid guide extending in the longitudinal direction parallel and noncoaxially adjacent to the gas spring and having one end portion fixedly connected to the one of the cylinder or the piston rod;

a flexible tension and compression element having first and second regions, the first region being guided in the guide, being connected to the other one of the cylinder and the piston rod and being operatively connected to the flap, and the second region being guided in a flexible casing; and a reversible drive connected to the second region such that the flexible tension and compression element is drivable by the reversible drive in the longitudinal direction, wherein the guide has a longitudinally extending slot on a side facing the cylinder, and wherein the device further comprises a connecting element protruding radially through the slot and fixedly connecting the first region of the tension and compression element to the other one of the cylinder and the piston rod.

2. The device of claim 1, wherein an extent of the guide in the longitudinal direction approximately corresponds to an extended length of the piston rod of the gas spring.

3. The device of claim 1, further comprising a pushing and pulling rod connected to the first region of the tension and compression element and a connecting member connecting a free end of the tension and compression element to a free end of the piston rod protruding out of the cylinder.

4. The device of claim 3, further comprising a supporting member fixedly connected to the cylinder and a helical compression spring radially enclosing the gas spring and the guide, the helical compression spring having a first end supported on the connecting member and a second end supported on the supporting member.

5. The device of claim 1, wherein the guide comprises a continuous guide tube or a plurality of guide tube sections arranged coaxially at a distance one behind another.

6. The device of claim 5, wherein the guide tube or the plurality of guide tube sections each comprise half tube parts connected to each other.

7. The device of claim 1, wherein the tension and compression element is a cable.

8. The device of claim 1, wherein the reversible drive is a reversible electric motor.

9. The device of claim 8, wherein the electric motor is a non-self-locking electric motor.

10. The device of claim 1, further comprising a lock for locking the flap in a closed position.

11. The device of claim 10, wherein the lock is an electromechanical lock.

12. The device of claim 1, further comprising a plurality of tension and compression elements which each lead to a gas spring and can be driven by the drive.

13. The device of claim 1, wherein the flap can be driven pivotably by a plurality of devices.

14. The device of claim 1, further comprising an electromechanical coupling for driving the tension and compression element.

15. The device of claim 1, further comprising a sensor for detecting a speed of movement of the flap and a device for comparing a measured value with a desired value, the drive being drivable in a stoppable or reversible manner if the measured value is lower than the desired value.

* * * * *